United States Patent [19]

Flory

[11] 3,911,453

[45] Oct. 7, 1975

[54] TWO COLOR INFORMATION RECORD

[75] Inventor: Robert Earl Flory, Princeton, N.J.

[73] Assignee: RCA Corporation, New York, N.Y.

[22] Filed: Nov. 30, 1973

[21] Appl. No.: 420,504

Related U.S. Application Data

[62] Division of Ser. No. 293,800, Oct. 2, 1972, Pat. No. 3,812,528.

[52] U.S. Cl. .......... 354/100
[51] Int. Cl.² .......... G03B 15/00
[58] Field of Search .......... 354/100, 102; 178/5.4

[56] References Cited

UNITED STATES PATENTS

| | | | |
|---|---|---|---|
| 3,478,661 | 11/1969 | Hecksher | 354/102 |
| 3,533,340 | 10/1970 | Macovski | 354/102 |
| 3,535,992 | 10/1970 | Goldmark | 354/102 |
| 3,719,127 | 3/1973 | Mueller | 354/100 |

*Primary Examiner*—John M. Horan
*Attorney, Agent, or Firm*—Eugene M. Whitacre; William H. Meagher

[57] ABSTRACT

A layered information record contains superimposed frames of information wherein a first frame contains luminance information of a scene as density variations of a cyan dye. A second frame superimposed on the first frame contains color encoded chrominance information as density variations of a yellow dye. In a system for playing back the layered information record, white light is projected through the superimposed first and second frames of information and viewed through a red filter for extracting the monochromatic luminance information and a blue filter for extracting the monochromatic color encoded chrominance information.

2 Claims, 12 Drawing Figures

TWO COLOR INFORMATION RECORD

This is a division of application Ser. No. 293,800, filed Oct. 2, 1972, now U.S. Pat. No. 3,812,528.

This invention relates to an information record and apparatus for playing back the information and in particular to an information record containing encoded color picture information of a scene.

In color encoding systems in which the luminance and chrominance information is recorded in a single frame of information on achromatic film, there exists the problem of crosstalk between the luminance and chrominance information. The chrominance information spatially modulates a suppressed carrier wave, the plurality of colors being encoded as phase modulation of the carrier wave whose frequency is above the luminance baseband information. To reduce this crosstalk problem, higher carrier frequencies for the chrominance carrier wave are chosen to separate the frequency spectrums of the luminance and chrominance signals. However, the use of higher carrier wave frequencies imposes restraints of the system design because the luminance, chrominance and index information must share the limited bandwidth of an image pickup device used to detect the recorded video information.

In a system of color encoding utilizing a color encoded film record as described by Goldmark in U.S. Pat. No. 3,535,992, two frames representative of a single scene are utilized side-by-side, one frame comprising the luminance information the other frame comprising the chrominance and index information. For such a system the area of film used is twice the amount used in a single frame system utilizing the same frame size. Additionally there is a problem in maintaining registration of the two rasters generated by scanning the separated luminance and chrominance frames.

SUMMARY OF THE INVENTION

An information record comprising a first frame of information recorded as density variations of a first subtractive color. A second frame of information recorded as density variations of a second subtractive color is superimposed on the first frame of information. The separate frames of information are separated by projecting light through the record and viewing the frames through first and second complementary color filters of the respective first and second subtractive primary colors producing respective first and second monochromatic images of the respective first and second frames of information.

A more detailed description of the invention is given in the following specification and accompanying drawings, of which:

DESCRIPTION OF THE INVENTION

Figure 1:
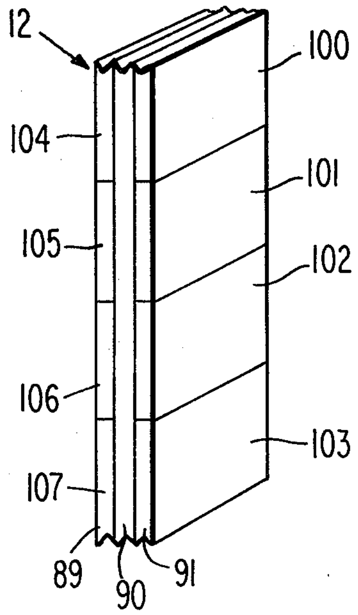
FIG. 1 is an information record embodying the invention.

FIG. 1 shows an information record according to the invention. Record 12 is comprised on three layers: layer 89 being a cyan dye layer; layer 90 being a transparent substrate; and layer 91 being a yellow dye layer. Layer 91 is comprised of a series of frames of information, 100–103. Layer 89 is also comprised on a series of frames of information, 104–107. Frame 104 is in superposition with frame 100. Frame 105 is in superposition with frame 101, frame 106 is in superposition with frame 102, etc.

The information in frame 106 is contained as variations of the cyan dye density in the layer 89. The information in frame 102 is contained as variations of the yellow dye density in the layer 91. In systems where light is transmitted through a medium, cyan, yellow and magenta are considered to be subtractive primary colors. Their complementary colors are respectively red, blue and green. The subtractive primary cyan layer 89 will pass all components of white light directed therethrough except red. The amount of red light allowed to pass being inversely proportional to the density of the cyan dye present. The subtractive primary yellow dye layer 91 will pass all components of white light directed therethrough except blue. The amount of blue light allowed to pass being dependent upon the density of the yellow dye present.

When the record is viewed through a blue filter only the image formed by density variations of the yellow dye will be observed. Likewise, when the record is viewed through a red filter only the image formed by density variations of the cyan dye will be observed. Systems for electrically and optically retrieving the information from the record are described in conjunction with FIGS. 5 and 8.

Figure 2:
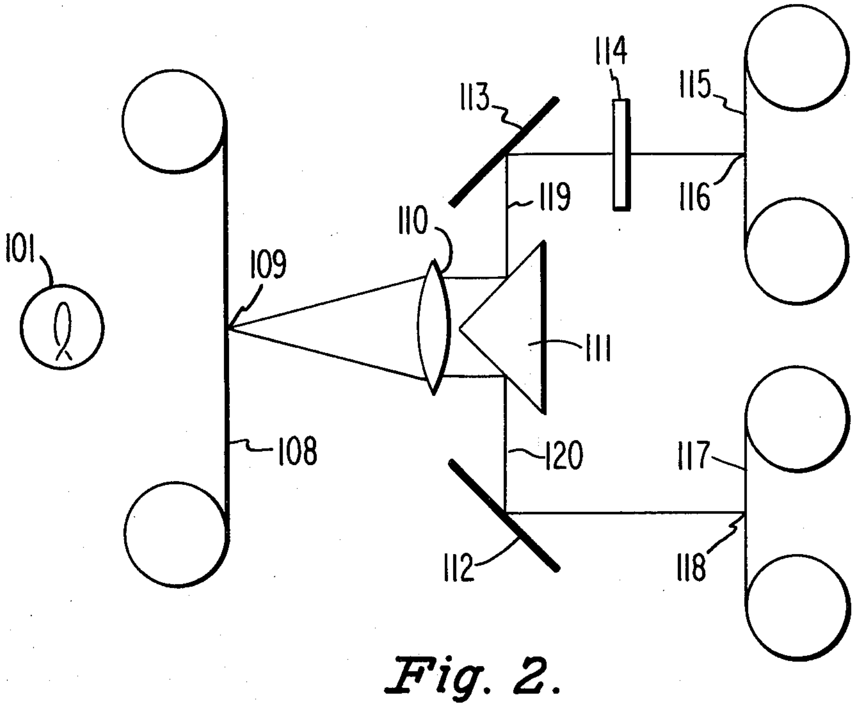
FIG. 2 is a diagram representing apparatus used during a part of the process for producing the information record described in FIG. 1.

FIG. 2 shows an apparatus for producing two monochromatic records from a single color film record. Light from light source 101 is projected through a color film record 180 containing frames of color information of a scene. Frame 109 is projected by imaging lens 110 upon beam-splitter 111 producing two beams 119 and 120. Beam 119 is reflected by mirror 113 through color encoding filter 114 forming an image on monochromatic film 115 at frame 116. The operation of color encoding filter 114 will be explained in conjunction with FIGS. 3A, 3B, and 3C.

Beam 120 is reflected by mirror 112 onto monochromatic film 117 forming an image at frame 118. Monochromatic film record 115 now contains the chrominance information of the scene comprising frame 109 of color film record 108 and monochromatic film record 117 contains the luminance information of frame

109. Subsequent frames of information are processed in a similar manner.

Figure 3A:
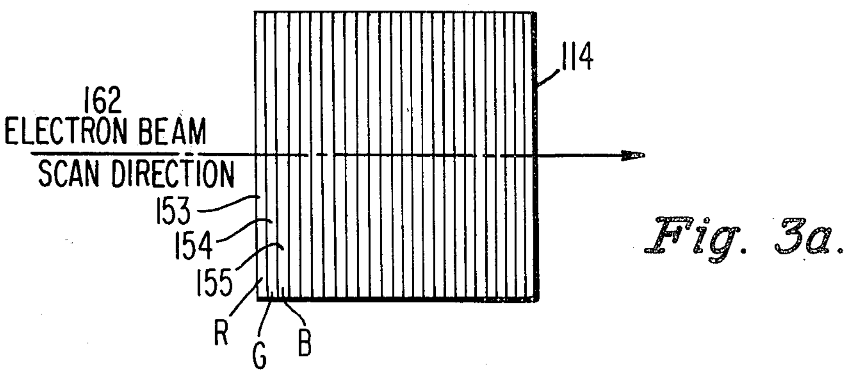
FIGS. 3A and 3B represent two color encoding filters which may be utilized in the recording apparatus shown in FIG. 2A.
Figure 6A:
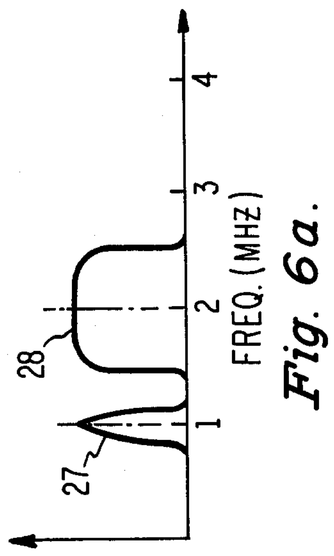
FIGS. 6A and 6B illustrate curves representative of the color, brightness and index signal frequency spectrum of signals obtained from the system shown in FIG. 5.

FIG. 3A is a diagram of a spatial color encoding filter 114 of FIG. 2 used to produce the spectrum shown in FIG. 6A when light from a scene is directed through the filter to an image pickup device such as a Vidicon. Spatial color encoding filter 114 is chosen such that the hue and saturation of a color image is contained as phase and amplitude modulation of a carrier wave derived from scanning. Filter 114 is comprised of color stripes 153, 154 and 155 (e.g., dichroic filters, organic dyes or Fabry-Perot filters). Stripes 153, 154 and 155 respectively have the property of transmitting respectively red, green and blue light. Alternatively, the colored filters can be of the type that allow transmission of cyan, magenta and yellow light. The stripes of filter 114 spatially separate color information and are arranged parallel to each other in groups of threes. The repetition of these color groups in the direction in which the electron beam is scanned and the scan velocity determine the frequency of the generated electrical color carrier. In this embodiment of the invention, filter 114 was chosen to provide a color carrier of 2 MHz and also modulates the color information. Therefore, if the colored image is comprised of red and blue light, filter 114 will spatially separate the red and blue light to provide a signal representative of the red and blue light where the phase angle between the red and blue information corresponds to the appropriate phase angle designated in the standard NTSC color phase diagram. Filter 114 also provides an index carrier wave using a similar method as the one described by Flory in U.S. Pat. No. 3,637,925, by varying the transmissivity to white light of the encoding filter at a spatial rate (i.e., 1 MHz) which is a sub-multiple of the spatial rate or frequency of the encoding stripes (i.e., 2 MHz).

The color encoding technique used is not limited to phase modulated spatial color encoding, other types of color encoding techniques may be used. For example, FIG. 3B illustrates a color encoding filter 50 which amplitude modulates a carrier wave as taught by Macovski, U.S. Pat. No. 3,378,633. Filter 50 has a vertical grid composed of alternate cyan stripes 51 and transparent stripes 52. Superimposed over the entire vertical or cyan grid is another grid with its spaced parallel stripes 45° to the cyan grid. This second grid is composed of alternate yellow stripes 53 and transparent stripes 54. The line density or number of stripes per inch is made the same for the two grids of the lines. The spacing of the lines can be chosen to produce a frequency spectrum as shown in FIG. 3C.

Figure 3C:
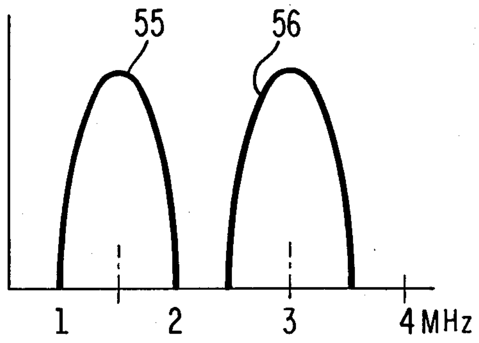
FIG. 3C shows curves representative of the color and index signal frequency spectrum produced by the filter shown in FIG. 3B.
Figure 3B:
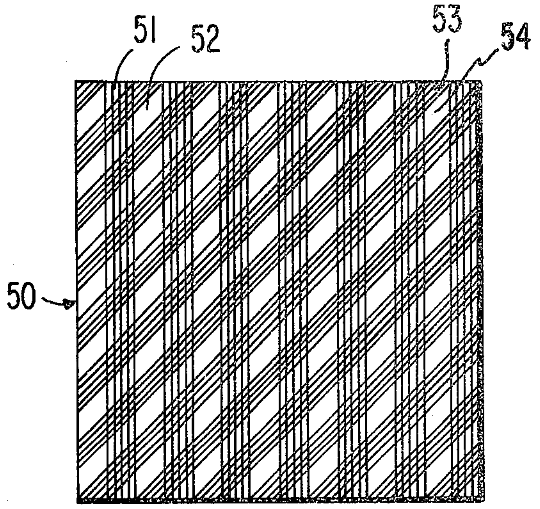

FIG. 3C is a graph representing the frequency and amplitude relationship of a signal obtained when light from a scene is directed through filter 50 onto an image pickup device such as a Vidicon. Curves 55 and 56 respectively represent the blue spectrum centered at approximately 1.5 MHz, and the red spectrum centered at approximately 3 MHz. The separation between the sidebands of the blue and red spectrum signals is determined by the angles made by the respective grids of the spatial filter 50 of FIG. 3B. Electrical signals representative of the red and blue information can be matrixed with the luminance information by known techniques to provide color television signals.

Figures 4A, 4B:
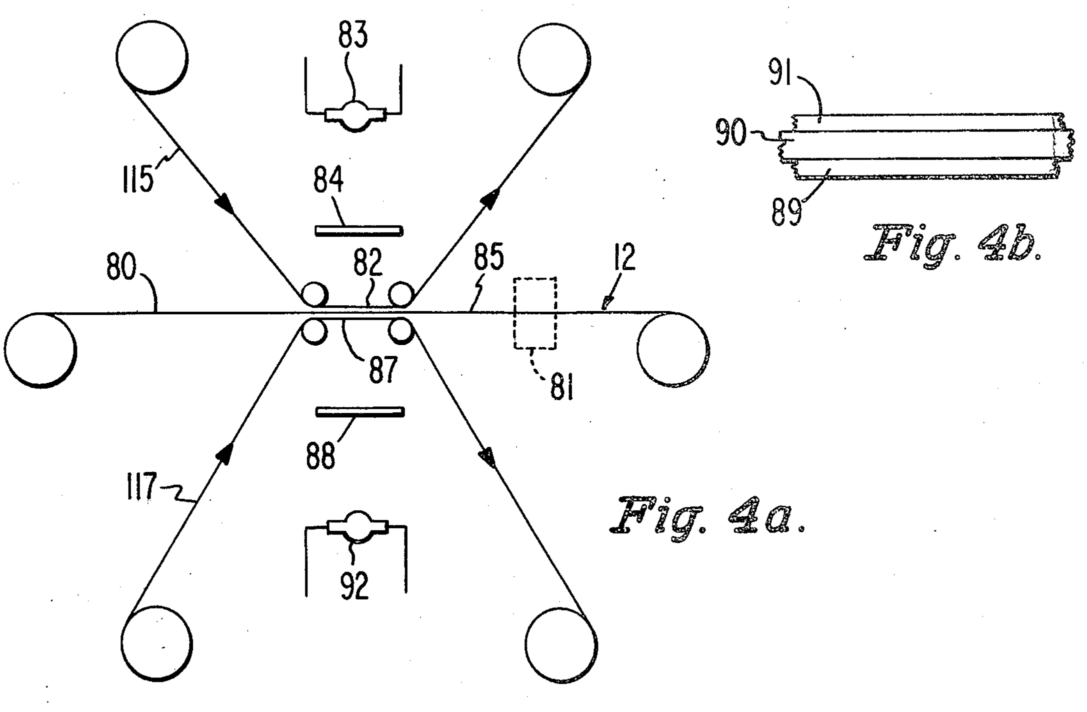
FIG. 4A illustrates apparatus by which the record embodying the invention described in FIG. 1 is made.
FIG. 4B is a side view of the film used in the process described in FIG. 4A from which the information record embodying the invention of FIG. 1 is made.

FIG. 4A shows an apparatus for producing the layered record embodying the invention. Unexposed film 80 is comprised of three layers. FIG. 4B shows the three layered undeveloped film. The first layer 89 is an ultraviolet light sensitive cyan diazo layer. A diazo layer is a light sensitive product commonly used for microfilm, which assumes its characteristic color when exposed to light and developed. These colors can be chosen to take the form of any of the subtractive primary colors. The second layer 90, is the film base and is opaque to ultraviolet light having a wavelength of 365 nanometers (nM). The third layer 91 is an ultraviolet light sensitive, yellow diazo layer. In FIG. 4A ultraviolet light from mercury lamp 92 illuminates filter 88 which exposes frame 87 of the luminance film record 117 onto layer 89 of film 80. Filter 88 allows only ultraviolet light having a wavelength of 365 nM to image the information contained in frame 87 onto 89 of the unexposed film 80. A mercury vapor lamp is used which has a characteristic output of ultraviolet light at 365 nM. In a similar manner, ultraviolet light from mercury lamp 83 illuminates filter 84 to expose layer 91 of undeveloped film 80 to the information contained on frame 82 of chrominance information record 115. Because the center layer of film 80 is opaque to light at 365 nM, the information contained on frame 82 does not interfer or crosstalk with information contained on frame 87. The exposed film 85 is then developed by developer 81 and the layered record 12 is produced containing the superimposed frames of information where the luminance information is contained as variations in density of the cyan dye of layer 89 and the chrominance information is contained as variations in density of the yellow dye of layer 91.

A variety of other materials can be used to make the two colored record 12 required, the changes in light sources and method of exposure being obvious to one skilled in the art once the type of film is chosen. The most obvious examples of existing materials are the color photographic films in current use. The color photographic films consist of two color components. Present multi-layer color films known by the trademark names of Kodachrome, Ektachrome, and Eastman Color Print Stock (current type numbers are 7380 and 7385), all contain three layers—yellow, magenta and cyan. The other three-color process, dye transfer, or Technicolor, use three similar dyes, but in a single layer. All of these processes could be used for the purpose of the invention by leaving out the magenta dye component. In the past, such processes were used in two color film known under trademark names of "Cinecolor" or "Trucolor". It should be noted that in any of the above described two color films, the use of subtractive primary colors would produce an unsatisfactory color gamut.

The process described in conjunction with FIG. 4A can use dyes used in either 3M's film known by the trademark name of "Color Key" or Technifax's "Diazochrome." All colors are developed in the same developer. A typical dye which is opaque at 365 nM and fully transparent for all useful visible wavelengths is used in making the Wratten filter No. 2B. Since a thin film base is desired for efficient use of the film volume, there will be sufficient depth of field to allow focus of the optical systems on both layers at once for any reasonable film thickness. The diazo film provides the advantages of lack of granularity, higher resolution film and lower cost of materials.

In a dye transfer process, best known under the name Technicolor, only two dyes are used to produce the record embodying the invention. This process involves printing with a dyed matrix in a manner similar to using an ink coated rubber stamp. The matrix is prepared by a photographic process such that its dye holding properties vary depending upon the amount of light it receives. The matrix comprising frames of information is then immersed in dye. The excess dye is removed and the matrix is then placed in contact with a clear substrate which accepts the dye image. A second dyed matrix is placed in contact with the clear substrate after removal of the first matrix and accepts the second dye image. This print is now the required two-color record, indistinguishable from the two-layer record described in conjunction with FIG. 4A.

Figure 5:
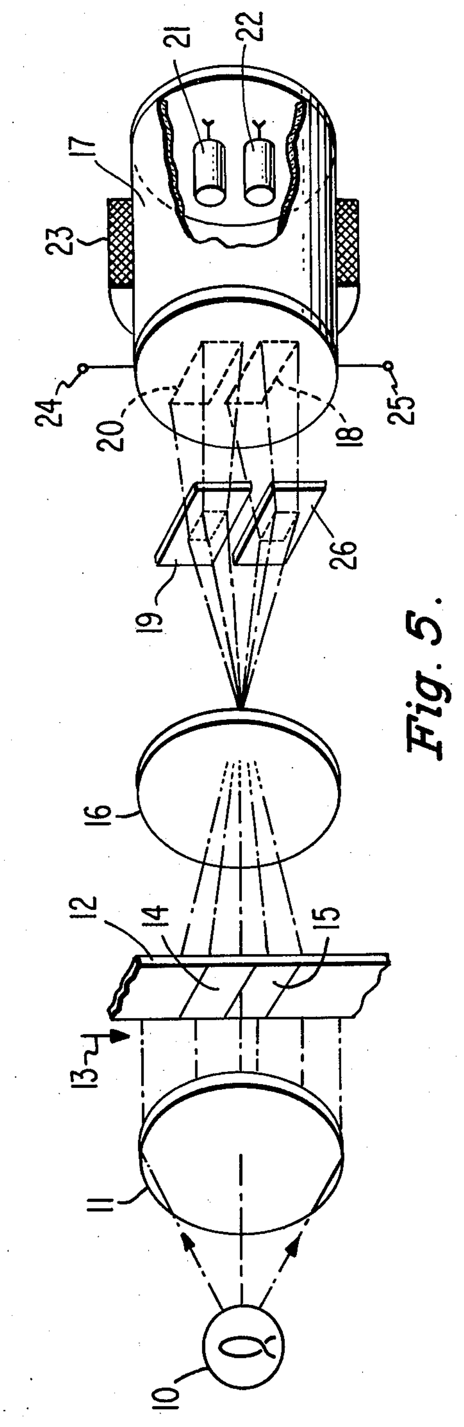
FIG. 5 illustrates a first embodiment of a system for playing back the record of FIG. 1.

FIG. 5 shows an embodiment of a two frame readout system embodying the invention described in FIG. 1. A white light source 10 comprising red and blue light illuminates, through a collimating lens 11, a layered record 12 which is moved frame by frame in the direction of arrow 13. Two frames (i.e., frames 14 and 15) containing two superimposed frames of information respectively contained as variations of cyan and yellow dye of layered record 12 are simultaneously illuminated. The light passes through frames 14 and 15 and is imaged by lens 16 upon two portions of a split target assembly 18 and 20 of image conversion device 17. It should be noted that two separate pickup devices can also be used instead of a two-target vidicon. Before the light representative of frame 14 impinges upon target portion 18, it is first passed through a red filter 26 which is the complementary filter to the cyan dye layer of layered record 12 and allows only red light to pass therethrough. The light representative of frame 15, before impinging upon target structure 20, first passes through blue filter 19 which is the complementary color filter to the yellow dye layer of layered record 12 and allows only blue light to pass therethrough. As was explained in conjunction with FIGS. 1–4, frames 14 and 15 of layered record 12 contain superimposed luminance and chrominance information of a scene. Blue filter 19 and red filter 26 are complementary color filters of the dye layers comprising record 12 and are used such that the chrominance information will be imaged upon target portion 20 and the luminance information will be imaged upon target portion 18.

Image conversion device 17 includes two separate electron guns 21 and 22. A single deflection yoke 23, including deflection coils adapted to be energized by suitable sources of scanning current at vertical and horizontal rates, is disposed around the envelope of image conversion device 17. The beams from guns 21 and 22 are simultaneously deflected by a common field produced by deflection yoke 23, thereby providing excellent registration of the rasters produced by the beams and eliminating one of the major problems heretofore encountered when two rasters have to be registered.

Since the luminance and chrominance images are imaged upon two separate portions 18 and 20 of the target assembly, the crosstalk between the luminance and chrominance signals is reduced. Also the dynamic range of the device 17 is more than doubled compared to that of a one frame pickup device, there being no sharing of dynamic range between chrominance and luminance portions of the image. There is therefore no need to restrict operation to the linear portions of the range to prevent beats between luminance and chrominance signals.

Conversion of the optical images into electrical signals is achieved as follows: as the electron beam from gun 21 is scanned across target portion 20 an electrical color signal is produced. The formation of the optical image to produce the color signal was described in conjunction with FIGS. 2 and 3A. The color signal is comprised of color information contained as phase and amplitude modulation of a suppressed carrier wave. This color signal modulates a 2 MHz carrier wave. Conversion to a standard NTSC color carrier can easily be achieved and will be described in conjunction with FIG. 7. An index signal can also be generated by incorporating an indexing mask or grating as is known in the art on the filter described in FIG. 3A. Other known methods of indexing can also be used. The index signal can be a carrier wave centered at 1 MHz which is used to compensate for non-linearities in scanning in a manner also to be described in conjunction with FIG. 7.

The output signal obtained from target portion 20 is coupled to a chrominance signal output terminal 24. In a similar manner electron gun 22 produces an electron beam which is scanned across target portion 18 which produces an electrical signal corresponding to the luminance information contained in frame 14. The signal obtained from target portion 18 is coupled to luminance output terminal 25.

FIG. 6A is a graph representing the frequency and amplitude relationship obtained when light from a scene is directed through filter 114 of FIG. 3A onto an image pickup device, such as a vidicon. Curves 27 and 28 are representative of the index signal and chrominance signal developed at chrominance signal output terminal 24. The frequency spectrum shown in FIG. 6A will be present in the above described system if a filter such as that described in FIG. 3A is used. The filter described in FIG. 3A can have the capability of producing an index signal as described earlier. Curve 27 represents an index frequency spectrum centered at 1.0 MHz and ideally extended from 0.9 MHz to 1.1 MHz. In an actual system the spectrum may be somewhat wider than 200 KHz, depending upon the nature of the scene, but the 200 KHz bandwidth will be adequate for the intended application. Curve 28 represents the chrominance information frequency spectrum centered at 2.0 MHz and extending from 1.5 MHz to 2.5 MHz.

Figure 6B:
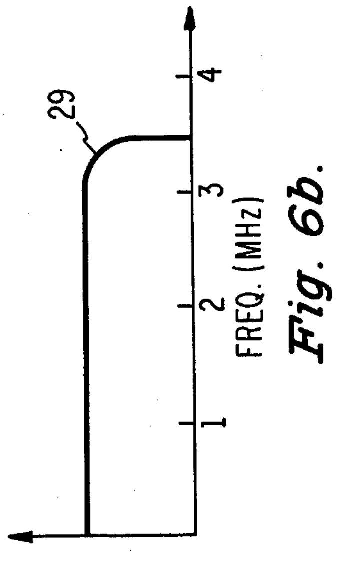

FIG. 6B is a graph representing the frequency and amplitude relationship of a signal at luminance output terminal 25. Curve 29 is representative of a typical luminance information frequency spectrum extending from 0 to 3.5 MHz developed at luminance output terminal 25 when a filter such as described in FIG. 3A is used in the process of making the film record.

The two frame simultaneous readout utilized in the system illustrated in FIG. 5 provides the advantage of very simple playback optics. That is, it avoids the need for beam splitting optics used in conventional two frame systems. Under dynamic readout conditions a one frame time displacement between luminance and chrominance information is not appreciably noticeable to the viewing eye. Therefore direct two-frame readout of the layered record wherein two adjacent information frames are projected onto image conversion device 17, can be achieved without the need for a beam splitter. In other words, the system uses a simplified optical arrangement (i.e., the single lens assembly 16), thereby avoiding the use of complex optics heretofore used in single frame split beam systems.

Figure 7:
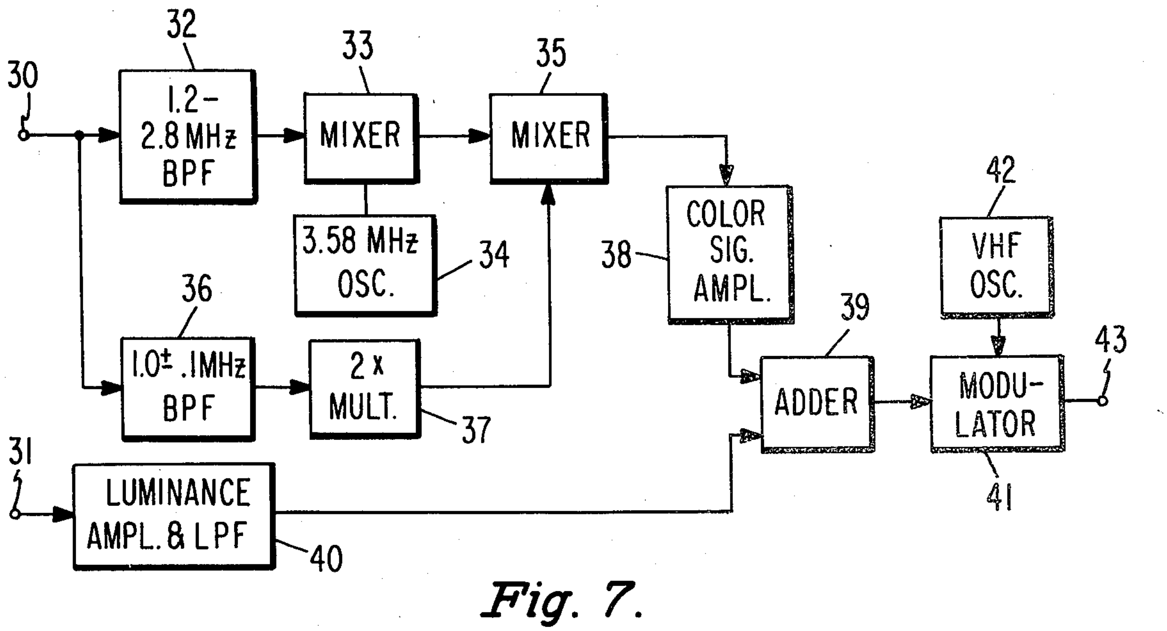
FIG. 7 is a block diagram of a signal processing system for processing the signals obtained from the apparatus of FIG. 5.

FIG. 7 is a block diagram of a signal processing system for processing the signals obtained from image conversion device 17 of FIG. 5. Chrominance output terminal 24 of image conversion device 17 is coupled to an input terminal 30 which is coupled to bandpass filter 32 wherein the chrominance information is separated from the composite electrical signal. Bandpass filter 32 has a center frequency of 2.0 MHz and a bandpass of 1.6 MHz. The output of bandpass filter 32 is coupled to a mixer 33 wherein the chrominance signal is mixed with a 3.58 MHz carrier frequency obtained from crystal controlled oscillator 34. The output of mixer 33 is a carrier frequency and sidebands centered at 5.58 MHz (3.58 + 2.0 MHz) containing the chrominance information.

Output terminal 24 is also coupled to bandpass filter 36 wherein the index signal is separated from the composite electrical signal. Bandpass filter 36 has a center frequency of 1.0 MHz and a bandpass of typically 0.2 MHz.

The index signal obtained from bandpass filter 36 is coupled to a multiplier 37. In this embodiment of the invention wherein the index frequency was chosen as 1.0 MHz, frequency multiplier 37 multiplies the index frequency by 2 to produce a frequency of 2 MHz — a frequency equal to the color carrier frequency.

The output signal of multiplier 37 is coupled to a mixer 35 where it is heterodyned with a chrominance signal from mixer 33 yielding the difference between the two input signal frequencies of 2 MHz and 5.58 MHz or 3.58 MHz. The output signal of mixer 35 is comprised of a carrier frequency of 3.58 MHz modulated by the chrominance information. The output signal of mixer 35 is amplified by color signal amplifier 38 and coupled to adder 39.

Luminance signal output terminal 25 from FIG. 5 is coupled to terminal 31 which is coupled to low-pass filter and amplifier 40. Low-pass filter and amplifier 40 has a bandwidth extending from 0 to approximately 3.5 MHz. This filter is used to provide an amplified signal comprised of luminance information up to 3.5 MHz and is coupled to adder 39 where the luminance signal is added to the chrominance signal. The output of adder 39 is coupled to modulator 41 which modulates a VHF carrier signal from VHF oscillator 42 with the output of adder 39. Standard television synchronizing and blanking signals are added by conventional apparatus not shown to provide a standard color television signal. The output of modulator 41 at system output terminal 43 provides a VHF signal modulated by the color television signal and is suitable for transmission or coupling directly to the antenna terminals of a television set.

The apparatus described in FIG. 7 eliminates the detecting to baseband of the color information to eliminate frequency variations caused by non-linearities in scanning and putting this information on a carrier wave. The frequency variations caused by scanning non-linearities in the image conversion device 17 of FIG. 5 to mixer 35 are comprised of signals containing the non-linear variations due to scanning. The subsequent mixing of these signals causes a cancellation of non-linearities of the signal at the output of mixer 35.

Figure 8:
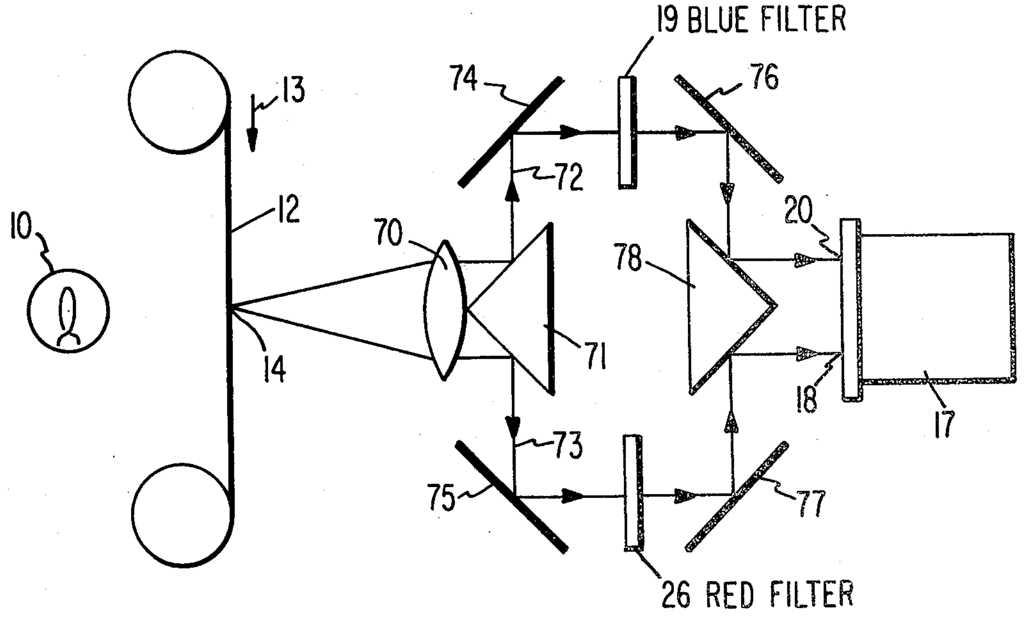
FIG. 8 illustrates a second embodiment of a system for playing back the record shown in FIG. 1.

FIG. 8 shows an embodiment of a single frame readout system embodying the invention described in FIG. 1. A light source 10 illuminates a single frame of layered record 12 moving in the direction of arrow 13. Layered record 12 is the same record used in the two frame system described in FIG. 5. This single frame system embodying the invention utilizes a single frame readout and does not have the advantage of simplified optics of a two frame readout system described in FIG. 5. The light illuminates frame 14 and is imaged by lens 70 onto beam splitting prism 71. Prism 71 splits the image of frame 14 into two beams 72 and 73. Mirrors 74 and 75 respectfully direct beams 72 and 73 through respective filters 19 and 26. Filter 19 is a narrowband blue filter centered at 470 nanometers (nM) and filter 26 is a red filter centered at 620 nanometers (nM). Beams 72 and 73 respectfully are reflected by mirrors 76 and 77 to prism 78 which directs the respective beams to form respective images in chrominance target 20 and luminance target 18 of image pickup device 17 which is similar to the split target pickup device described in conjunction with FIG. 5.

Operation of the devices embodying the invention described in FIGS. 5 and 8 can best be described as follows: the luminance information of a scene is recorded on a frame of a layered film as density variations of a first subtractive color dye, cyan. Color encoded information of the same scene is recorded on a second frame of the layered film as density variations of a second subtractive color dye, yellow. The first and second frames are in superposition to each other. The process for recording this information has been described in conjunction with FIGS. 4A and 4B. The variations in density of the cyan dye determine the amount of the red light component of the light being transmitted therethrough allowed to pass. Likewise, the variations in density of the yellow dye present will determine the amount of the blue light component of the light being transmitted therethrough allowed to pass. Therefore, when the light that has passed through the record is passed through a complementary color filter of one of the dye colors, only a monochromatic image of the information contained on that dye layer will be formed.

Generally, in a playback system the white light is projected through first the cyan layer, then through the substrate layer which is transparent to visible light, and onwards through the yellow layer, produces luminance and color encoded chrominance information contained as variations of the red and blue light components of the light passing through the record, respectively. This light, containing red and blue components varying in accordance with the information contained on the layered record, is passed through complementary color filters of the dye colors, and images are then formed from the light allowed to pass by the color filters of the information contained on that dye layer. A red filter will allow only red components of the light to pass forming a monochromatic image of the luminance information contained on the cyan dye layer. A blue filter will allow only blue components of the light to pass forming a monochromatic image of the encoded chrominance information contained on the yellow dye layer. As described in conjunction with FIGS. 5 and 8, these two images are projected upon two targets of an image pickup device and combine to form television signals representative of a scene. It should be noted that here also two separate pickup devices could be used in place of the split target device.

By producing a color encoding film containing superimposed frames of information, crosstalk between the two images is greatly reduced. It has been shown experimentally that if narrow band red and blue filters are respectively centered at 470 nM and 620 nM, neither will have crosstalk from the other. Contrast of the luminance and chrominance channels will be on the order of 30:1, which is suitable for producing satisfactory color television signals.

What is claimed is:

1. A method of producing an information record containing superimposed frames of information, said method comprising the steps of:

exposing with a selected wavelength of light a given region of a first layer of a multilayer information record to an image of a first monochromatic record containing luminance information from a frame of color film;

exposing with said selected wavelength of light a region of a second layer of said multilayer information record, in substantial registry with said given region of said first layer, to an image of a second monochromatic record containing color information of said frame of said color film as encoded monochromatic spatial modulations; and developing said exposed layers to form said information record such that said first and second layers contain, in superimposed relationship, said respective first and second images of said respective first and second monochromatic records as density variations of respective dyes of respective first and second substractive colors.

2. The method described in claim 1, wherein said steps of exposing the respective first and second layers of said information record are effected with ultraviolet light and said multilayer information record includes a center layer disposed between said first and second layers of said information record, said center layer being opaque to said selected wavelength of ultraviolet light.

* * * * *